United States Patent [19]

Altman

[11] 4,453,458
[45] Jun. 12, 1984

[54] FOOD PROCESSING APPARATUS

[76] Inventor: James E. Altman, 501 Fraley St., Gray, Ga. 31032

[21] Appl. No.: 396,017

[22] Filed: Jul. 7, 1982

[51] Int. Cl.³ .................. A23N 3/04; A23N 4/00; A23N 15/02
[52] U.S. Cl. .................................. 99/544; 99/547; 99/564; 99/642; 99/643
[58] Field of Search .............. 99/537, 538, 544, 545, 99/547, 548, 542, 543, 546, 564, 552–556, 559, 560, 635, 637, 638, 639, 642, 643; 426/478, 481, 484, 518

[56] References Cited

U.S. PATENT DOCUMENTS

| | | |
|---|---|---|
| 3,563,289 | 2/1971 | Altman . |
| 3,754,470 | 8/1973 | Console ............................ 99/638 X |
| 4,069,909 | 1/1978 | Altman et al. . |
| 4,111,112 | 9/1978 | Altman . |
| 4,112,837 | 9/1978 | Altman et al. . |
| 4,112,838 | 9/1978 | Altman et al. . |
| 4,176,595 | 12/1979 | Shaw ...................................... 99/638 |
| 4,216,712 | 8/1980 | Altman . |
| 4,252,056 | 2/1981 | Altman . |

Primary Examiner—Timothy F. Simone
Attorney, Agent, or Firm—Hill, Van Santen, Steadman & Simpson

[57] ABSTRACT

Automated food processing apparatus and methods of the type adapted for coring food products wherein a constantly sized core is removed from all food products of a group independently of the product size variation from one member to another of the group.

4 Claims, 9 Drawing Figures

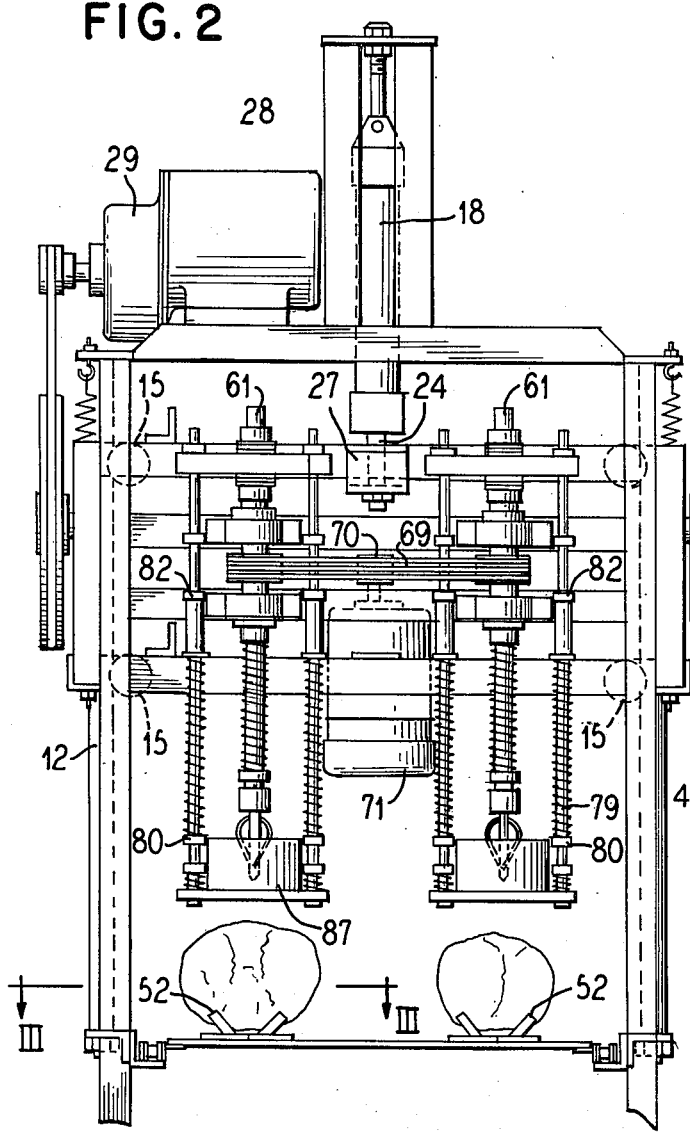
FIG. 2
FIG. 3
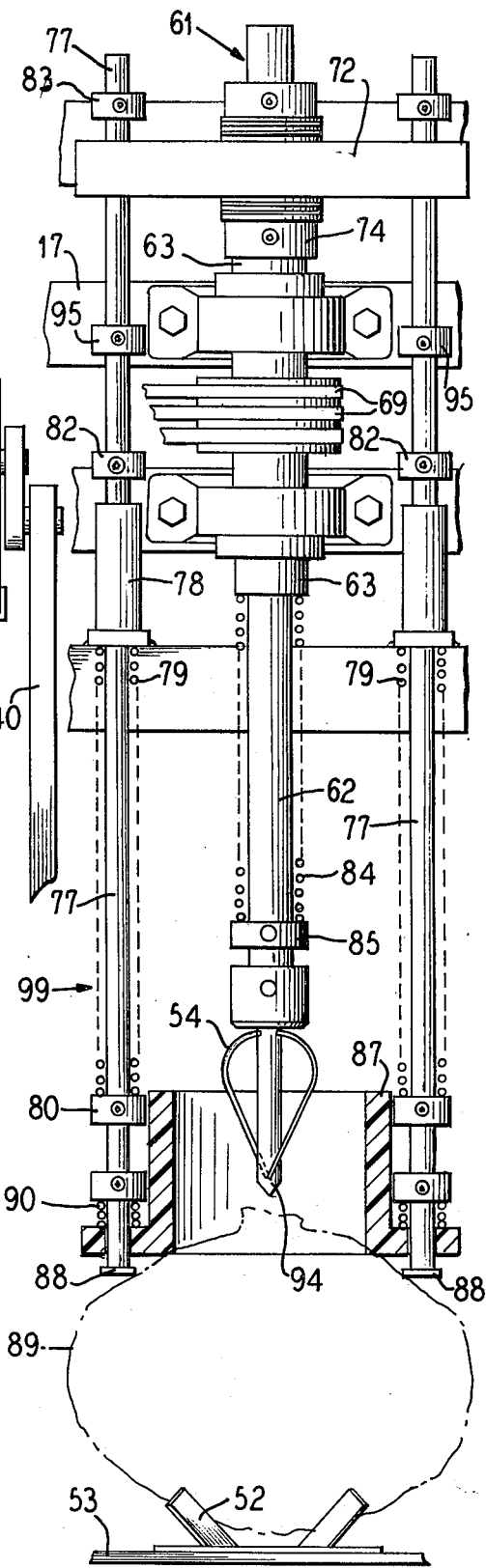
FIG. 4

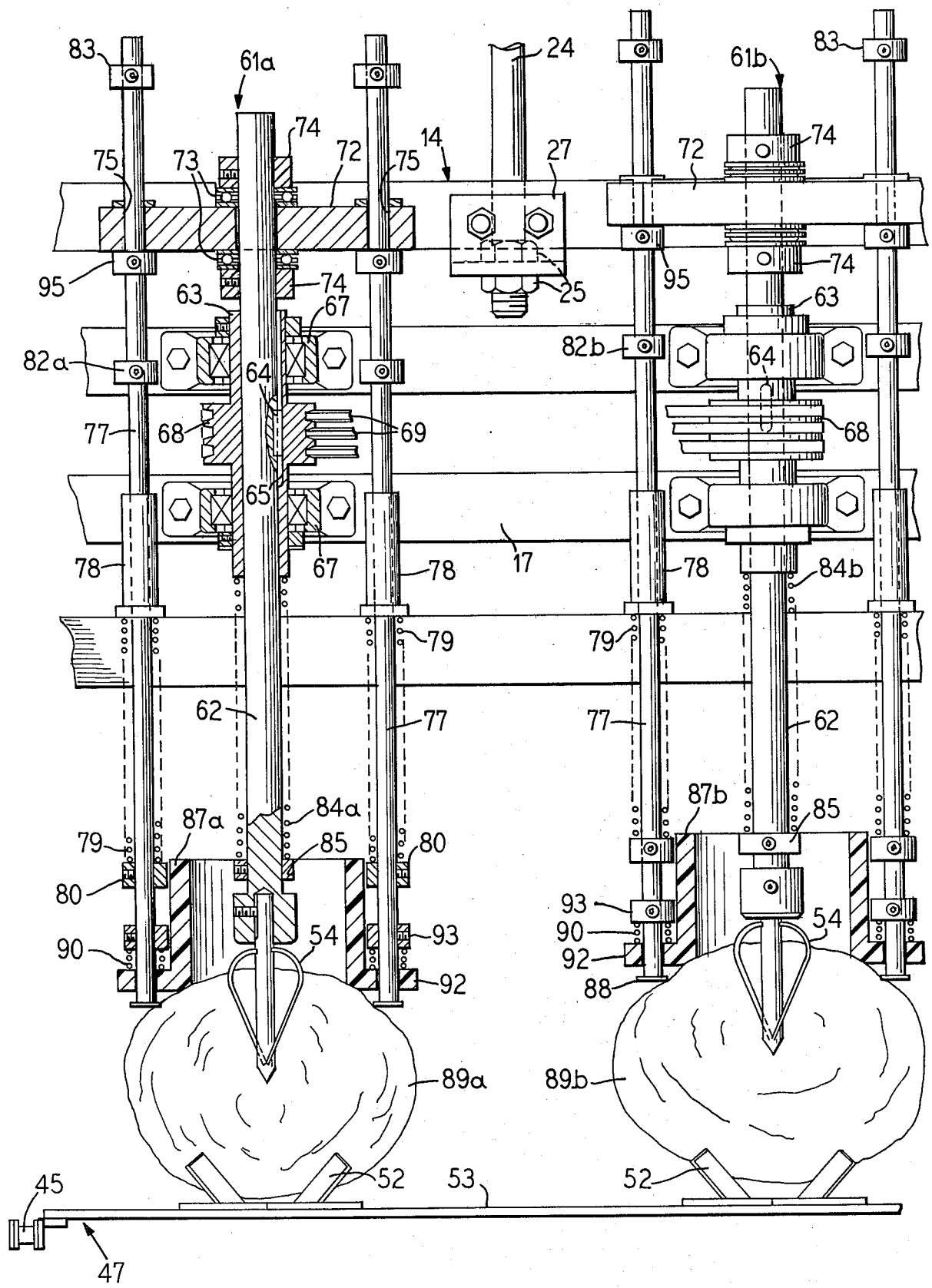

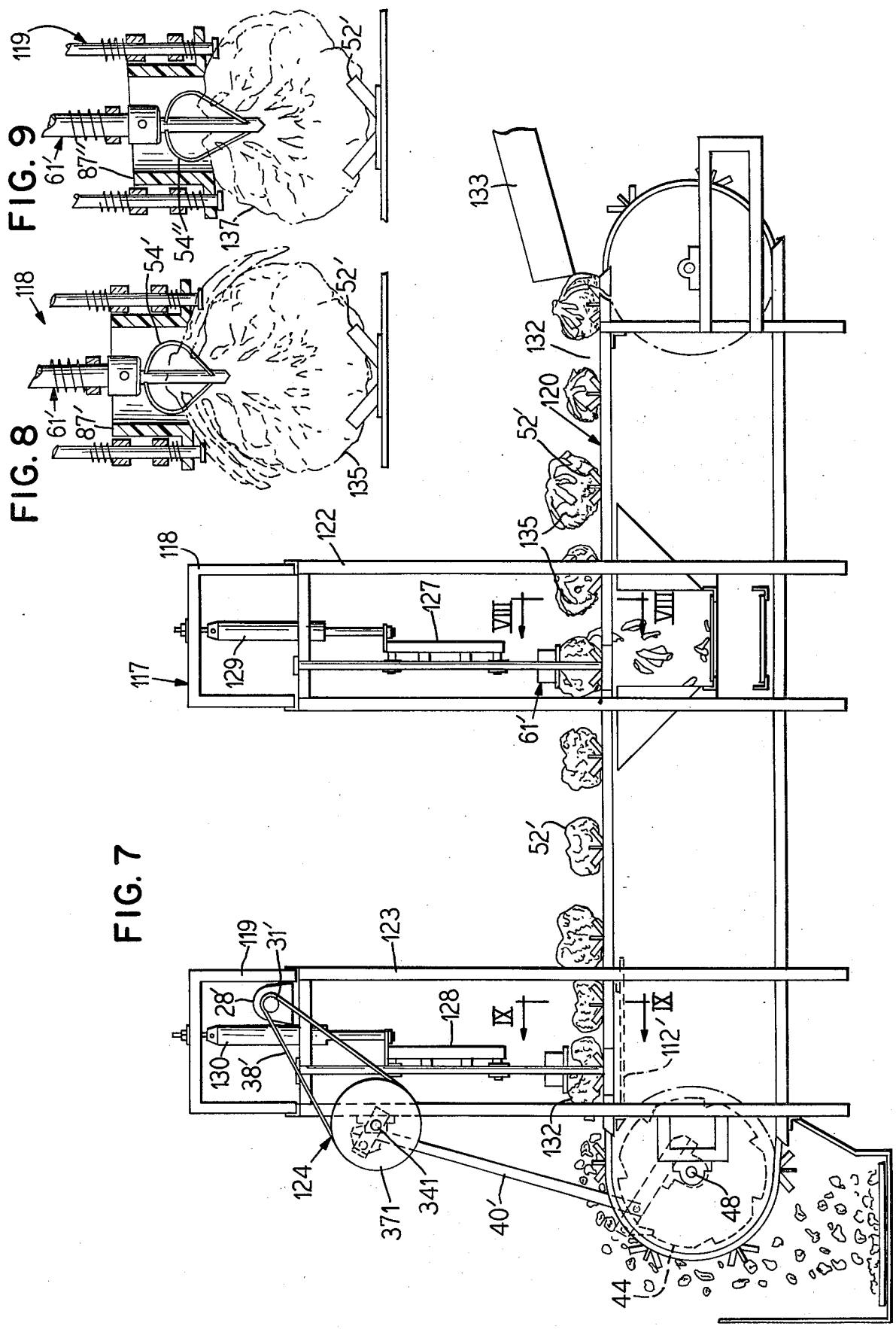

FOOD PROCESSING APPARATUS

BACKGROUND OF THE INVENTION

1. Field of the Invention

This invention is directed to automatated food processing apparatus and methods of the type adapted to core food products and more particularly to food processing apparatus and methods having automatic measuring means for coring variably sized vegetables and the like.

2. Description of the Prior Art

Some vegetable coring devices have apparently previously been in limited use but most coring operations are still done by hand. One coring device presently in use comprises a blade member mounted on a rotary spindle in which the operator hand holds a food product such as a cabbage head or the like and pushes it down onto the upturned rotating blade to cut out the core portion of the head so that the head may subsequently be shreaded to produce a slaw or the like.

This device, besides being low in productivity and generally inefficient, is exceedingly dangerous to use. Further, since the operator must push the cabbage head downward into the rotating blade, he is unable to see how much of the core has been removed commonly resulting either in wasteful overcoring or in allowing portions of the core to remain with the cabbage.

All other coring devices now known require the skill of an operator to judge the degree of coring penetration. Also, these machines generally place the operator in a hazardous position, close to the coring knife.

BRIEF SUMMARY OF THE INVENTION

This invention concerns a system for coring vegetables, especially variably sized vegetables automatically, safely and with substantially no waste.

More particularly, the present invention concerns an automatic food product coring apparatus in which a conveyor automatically moves a series of cabbage heads or the like into and out of a coring station in timed relationship to a translatable carriage assembly supporting a coring device. The coring device includes a vegetable hold down means and a rotatably driven blade or coring knife assembly which are both translatably movable with the carriage assembly means during at least a portion of the total carriage travel, so as to bore out only the core portion of a cabbage head or the like regardless of the head size. The hold down means in moving down with the carriage means comes into abutting contact with the top of a given cabbage head or the like in the coring station. The cabbage head is positioned on the conveyor with its core portion directed upward. A stop collar carried by the hold down means is positioned relative to the top of the cabbage head with an abuttment contact between the hold down means and the cabbage head. In operation the blade assembly continues to move downward with the carriage to bore out the core portion of the head to a depth limited by the stop collar associated with the hold down means.

The present invention further concerns a method of coring foods whereby a relatively uniformly sized core member is removed from each of a plurality of corable food pieces which pieces can vary in outside dimensions with respect to one another.

Since it is well known that the core portions of each member of a group of vegetables, such as cabbage heads, are generally equal in size regardless of the individual head diameters, a consistently complete core removal operation can be accomplished with the present invention by sensing the elevational level of each individual vegetable head above a conveyor surface and thereafter boring a given distance into each head during the coring thereof. When the core is completely removed, a depth limiting member carried by the blade assembly abutts the stop collar associated with the vegetable hold down means to halt further downward movement of the blade assembly with the descending carriage asssembly. The carriage assembly travel is arranged to provide the required coring knife penetration down into the smallest cabbage heads which may be processed.

The present invention is also adaptable for processing such food items such as cauliflower, whereby undesirable plant leaves may be initially removed along with a portion of the plant item at a first coring station and subsequently at a second station along the conveyor the stem or core may be further penetrated to separate the caulifower head into discrete flowerlets.

An object of the present invention is to provide an automated processing apparatus and method which is adapted to completely and efficiently remove the core portions of cabbage heads regardless of the head size.

Another object of the present invention is to provide an automatic vegetable processing apparatus which is adapted to core cabbages or the like advancing along a conveyor through a coring station in a random range of head sizes in which only the desired core portions of the cabbages are completely removed.

Another object of the present invention is to provide a vegetable coring apparatus which secures the head in a coring station and therewith sets the penetrating limit of a coring blade assembly.

Another object of this invention is to provide a vegetable coring apparatus which automatically measures the size of a given vegetable head and therewith sets a stop which is cooperative with a depth limiting member to limit penetration into head by a coring blade assembly.

Another object of this invention is to provide a method of coring certain vegetables which includes the steps of measuring the size of a given vegetable head, presetting a coring stop position relative to the measured head and thereafter drilling into the head to a point established by the coring stop portion to remove a generally standard size core from the vegetable without excessive or insufficient core removal.

Another object of this invention is to provide a system for coring and separating a cauliflower into flowerlets which is preferably practiced automatically and continuously.

Other and further objects, advantages and uses for the present invention will be apparent to those skilled in the art from the following specification taken in conjunction with the drawings.

BRIEF DESCRIPTION OF DRAWINGS

In the drawings:

FIG. 2 is a fragmentary view taken along the line II—II of FIG. 1;

FIG. 3 is a fragmentary enlarged plan view of a holder for vegetables and the like shown as part of a conveyer taken along the line III—III of FIG. 2;

FIG. 4 is an enlarged fragmentary vertical sectional view but showing the carriage assembly and elements associated therewith shown at the beginning of a vegetable coring operation;

FIG. 5 is a view similar to FIG. 4 but showing the carriage and associated elements in the fully extended coring position;

FIG. 7 illustrates in generally diagrammatic form an alternative embodiment of the present invention in side elevation;

FIG. 8 is an enlarged fragmentary view taken along the line VIII—VIII of FIG. 7 illustrating the operation accomplished in a first stage of the FIG. 7 apparatus; and FIG. 9 is a view similar to FIG. 8 and further illustrating the operation sequence accomplished in the second stage of the FIG. 7 apparatus.

DETAILED DESCRIPTION

Figure 1:
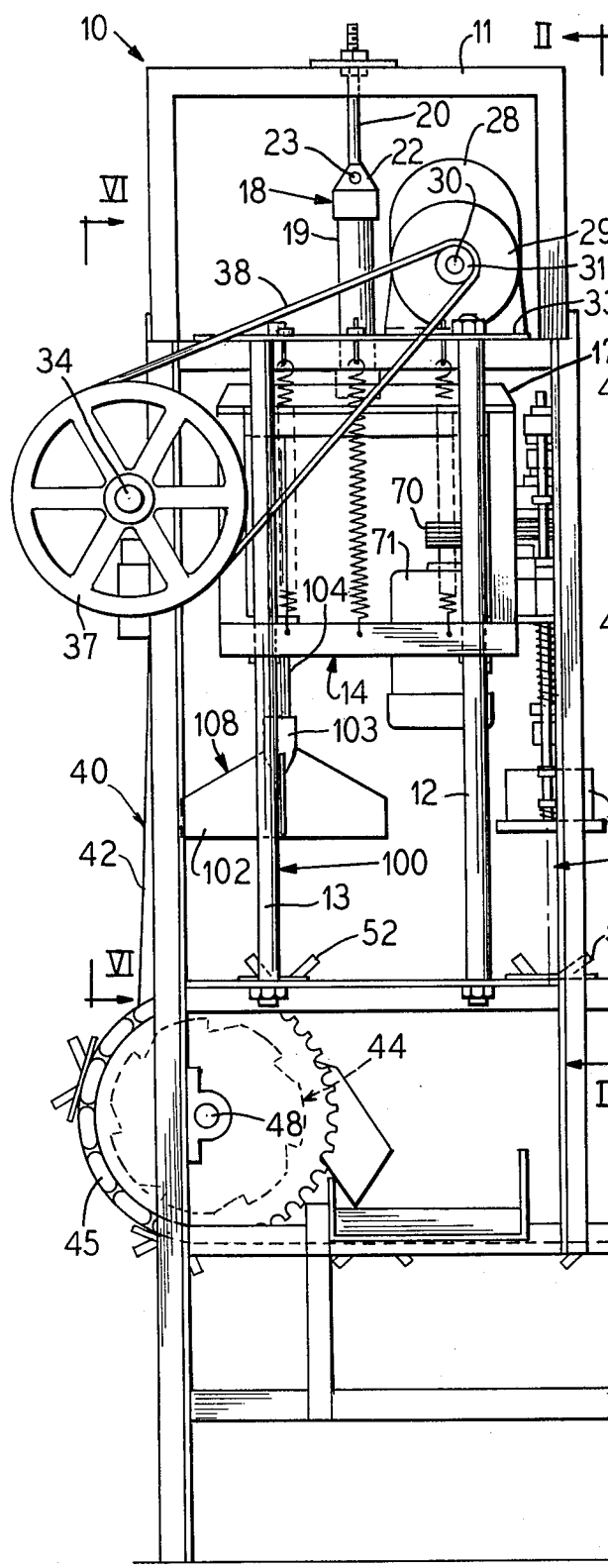
FIG. 1 is a side elevational view of one preferred embodiment of the present invention.
Figure 6:
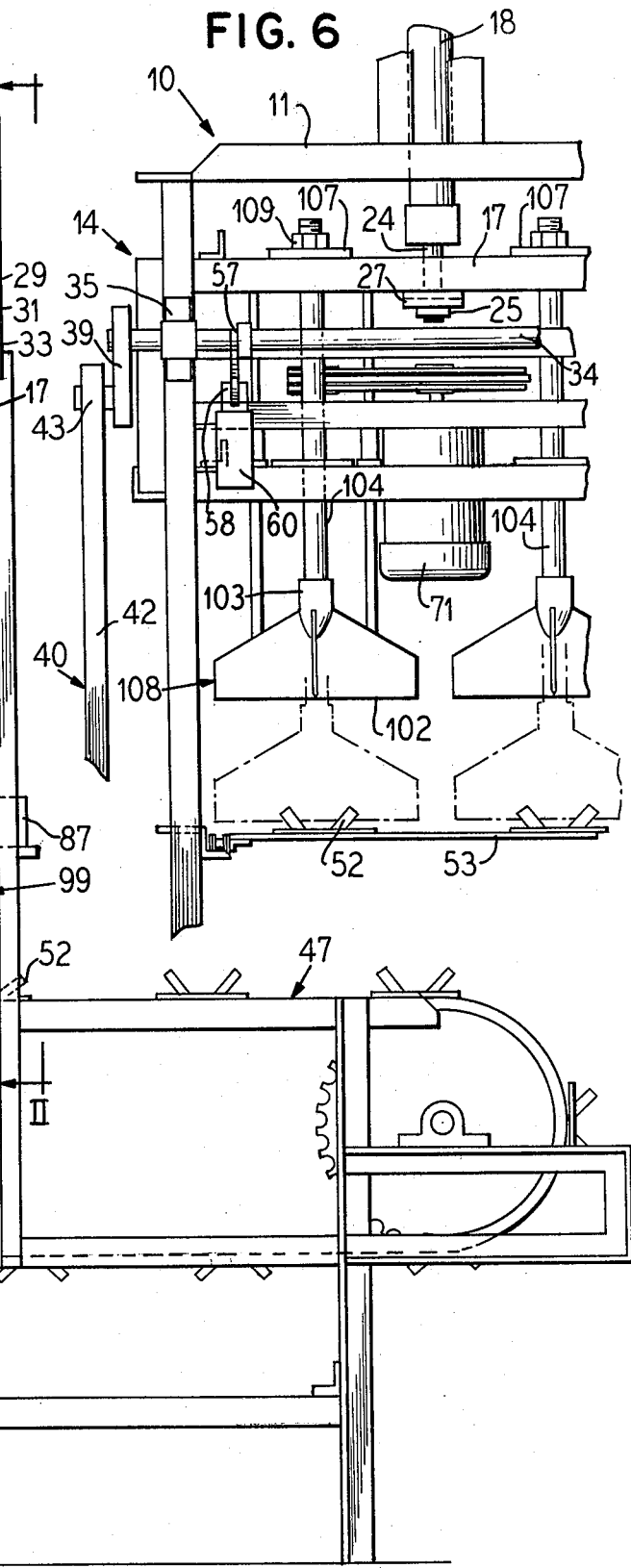
FIG. 6 illustrates the slicing station of the apparatus of FIG. 1 as seen from the line VI—VI in FIG. 1 illustrating operation thereof.

Referring to FIGS. 1-6, there is seen a food processing apparatus which is herein designated in its entirety by the numeral 10. Apparatus 10 incorporates a stationary frame assembly 11 which, in turn, has affixed thereto two pairs of track bars 12 and 13, respectively, each one of each pair of track bars being disposed on opposing sides of the frame 11 in aligned vertically spaced parallel relationship to one another. The apparatus 10 incorporates a carriage assembly 14 which is mounted for vertical reciprocatory travel motions along the bars 13 and 14 by means of bearing wheels 15 which ride in mating engagement with adjacent portions of the track bars 13 and 14. The carriage assembly 14 is thus adapted to reciprocatorily move vertically between respective upper and lower positions relative to frame 11, the upper position being shown, for example in FIGS. 1, 2 and 6, and the lower position being illustrated, for example, in FIG. 5. The carriage assembly 14 itself incorporates a rectangular carriage frame 17 formed of angle iron sections, or the like, as desired, which are welded together, or the like, at positions of jointure. Frame 17 can have any convenient structural configuration for the practice of the present invention.

Reciprocal movements of the carriage assembly 14 between its upper position and its lower position are effectuated by means of a pneumatic cylinder assembly 18. The terminal end of a cylinder body or housing 19 of cylinder assembly 18 is pivotally suspended from an upper cross member of frame 11 by means of a rod 20 whose lower end is joined to a clevice 22 of cylinder assembly 18 by a pin 23 or the like, pivotally engaging the clevice 22 and the rod 20. The rod 20 is threaded over a portion of its length from its upper or terminal end so that rod 20 can be used to adjust the height of the cylinder assembly 18, and hence the reciprocal movements upwards and downwards which can be effectuated by the cylinder assembly 18 of the carriage frame 17. The cylinder assembly 18 is provided with an extensible and retractable piston rod 24 whose lower end is threaded and provided with nuts (paired) 25, and such lower end of the rod 24 is interconnected through a flanged portion of transverse member 27 of carriage frame 17 at a mid portion thereof by means of the nuts 25. The cylinder assembly 18 is of the double-acting pneumatic type in the present embodiment resulting in driven extension and retraction movements of the rod 24 thereof responsive to cylinder air pressures. Thus, carriage assembly 14 reciprocates relative to frame 11 along the bars 12 and 13.

An electric motor 28 interconnects with a transmission 29 in an interconnected housing arrangement and transmission 29 has an output shaft 30 on the terminal end of which a sheave 31 is keyed. Motor 28 and transmission 29 are mounted on frame 11 stationarily by a bracket 33 (not detailed).

A cross-shaft 34 transversely extends across frame 11, and is journaled adjacent its respective opposed end regions by a pair of bearing blocks 35. The blocks 35, in turn, are securred to frame 11 by bolts or the like (not shown). On one end of the shaft 34 and keyed in alignment with sheave 31 a pulley wheel 37 is located. A V-belt 38 transfers power from sheave 31 to sheave pulley wheel 37 thereby rotatably driving the shaft 34 and turning a drive crank 39 adjustably affixed to the shaft 34 (for initial turning of the conveyer drive 40). The drive crank 39 is, in turn, interconnected to one end of lever arm 42 by a bearing block 43.

A ratchet drive assembly not detailed but similar to that shown and described in the James E. Altman U.S. Pat. No. 4,252,056 issued Feb. 24, 1981 is here preferably employed. This ratchet assembly is effective to turn drive wheel 44 for driving chains 45 of conveyer system 47 in a proper desired timing sequence relative to other machine functions.

Apparatus 10 has a stop and go power transfer means for coupling driven shaft 34 with conveyer drive shaft 48 and for converting a continuous rotation of the driven shaft 34 into a discontinuous rotation of the conveyer drive shaft 48. Thus, for a predeterminable number of degrees of rotation of the driven shaft 34, the conveyer drive shaft 48 rotates a predeterminable number of degrees, and for the remaining degrees of rotation of the driven shaft 34 up to 360° of rotation thereof, the conveyer drive shaft 48 is stationary, thereby causing the conveyer system 47, which is of the closed loop type, to exhibit predetermined discontinuous stop and go advancing movements along its path of travel. Such movements are regulated by rotational movements of the driven shaft 34. Any convenient stop and go power transfer means or conventional timing mechanism can be employed to synchronously drive the conveyer system 47.

In apparatus 10, a plurality of vegetable holders 52 are secured in spaced relationship to one another transversely across each slat member 53, the conveyer system 47 employing a plurality of such slat members 53, each slat member 53 being in a longitudinally spaced but parallel relationship to others thereof and being secured at opposing end portions thereof to respective ones of a pair of laterally spaced, parallel endless drive chains 45 in the conveyer system 47.

The movement of each slat member 53 with its row of vegetable holders 52 is so regulated and adjusted that, as a consequence of the stop and go movement the individual rows of vegetable holders 52 are aligned generally with the respective vertically oriented axes of a plurality of coring knives 54 when the conveyer system 47 is in its stop configuration. The holders 52 are loadable with vegetables, such as cauliflower, cabbage, or the like, by hand or mechanically (means not shown), the individual slat members 53 bringing each row of vegetable holders 52 into a horizontal configuration. The individual rows of vegetable holders 52 are thus sequentially moved in a row by row manner across frame 11 horizontally and finally come into alignment with individual coring knives 54 as part of a single sequence of operations of apparatus 10. This sequence is repeated indefinitely during normal operation of the apparatus 10 as those skilled in the art will appreciate.

In apparatus 10, the detailed sequence of operation of carriage 14 is here synchronized with rotation of the driven shaft 34 through the use of a cam 57 which is circumferentially mounted about the shaft 34. A lobe of this cam 57 is adapted to control a cam follower actuating roller 58. Roller 58 is associated with a valve assembly 60. Valve 60 controls pneumatic air flow through respective chambers of the double acting cylinder 18 in response to position and circumferential shape of the lobe of the cam 57 so that operational movements of the carriage 14 are synchronized with other apparatus 10 movements so as to complete the desired coring operation.

Each coring assembly 61 employed in the apparatus 10 includes a shaft 62 which is carried in a sleeve 63 that is itself keyed to the shaft 62 by a key 64 which is longitudinably slidable in a key way 65 defined in the circumferential surface of sleeve 63. The sleeve 63 is journaled in a pair of bearing blocks 67 which are rigidly secured to the carriage frame 17 by nut and bolt assemblies (not detailed). The sleeve 63 is provided with a prerfably multigrooved sheave 68. A plurality of V-belts (here 3) driveably engage each sheave of a plurality of coring assemblies 61 in an apparatus 10 embodiment with the V-belts being driven by a drive sheave 70. A motor 71 carried by the frame 17 drives through its drive shaft the sheave 70.

The upper extension of the shaft 62 extends through a locating bar 72 and the shaft 62 is journalled relative to the bar 72 by means of thrust bearings 73. The bearings 73 and the bar 72 are held in a fixed assembled relationship relative to one another by means of collars 74 (paired). The collars 74 are secured rigidly to the shaft 62. Thus, the shaft 62 can rotatably move relative to the bar 72. The opposing end regions of the bar 72 are provided with doors 75 (paired) which are provided with axes that are generally parallel to the axis of shaft 62. These bores 75 receive therethrough, respectively, individualy ones of each of a pair of guide rods 77. Each rod 77 is extended through a mounting sleeve 78 (paired), each sleeve 78 being disposed with its axis parallel to that of shaft 62 but on an opposing side thereof. Each sleeve 78 is fixed by means of welding or the like to the carriage frame 17. Thus, the guide rods 77 are adapted to be longitudinably slideable through the sleeves 78.

Each guide rod 77 is provided with a circumferentially located biasing coiled spring 79 in a region extending from the bottom of a mounting plate associated with each sleeve 78 downwardly to an adjustable stop collar 80 located in longitudinally spaced relationship to the bottom end of each rod 77. By means of the stop collar 80 the tension on the coiled spring 79 about each rod 77 can be adjusted to a desired extent by the collar 80, as those skilled in the art will appreciate. The biasing effect between each of the pair of the coiled springs 79 is preferably equal. Thus, each of the guide rods 77 is normally biased downwardly relative to the collar 78 associated thereith. The limit of downward biasing action for each rod 77 is set by the location of a stop collar 82 associated with each rod 77. For machine operating safety, each rod 77 is additionally provided with a limit collar 83 preventing overtravel of bar 72 relative to rods 77.

To bias the shaft 62 in a downward configuration, the same is provided circumferentially with a coiled spring 84 about a lower region thereof, the spring extending between the lower end of the sleeve 63 and an adjustable set collar 85. Accordingly, the shaft 62 is biased downwardly to the point where the collar 74 abutts the top end of the sleeve 63 as generally shown, for example, in FIG. 2 or in FIG. 4.

With vegetable pieces duly positioned in holders 52 and generally aligned with coring assemblies 61, as illustrated, for example, in FIG. 2, a coring operation is initiated. The cylinder assembly 18 is energized to cause the carriage assembly 14 to descend. As the descent continues, a crown comes into engagement about its lower circumferential parameter with the head portion of the vegetable piece undergoing a coring operation. Each crown 87 is a generally cylindrically shaped sleeve or tube bearing an integral flange outwardly extending radially from the bottom thereof. This flange serves to support the crown from the rods 77 because apertures coaxial with the axis of the crown slideably engage the rods 77 on opposing sides of the crown 87. Stop heads 88 at the bottom of each rod 77 retain each crown 87 against the pull of gravity in engagement with the rods 77.

When the carriage 14 moves downwardly, shaft 62 and rods 77 of each coring assembly 61 move downwardly therewith initially. When crown 87, carried as it is on the rods 77, engages the top of a vegetable piece 89, an initial hold-down force is developed by the action of the equalizing springs 90, which are positioned circumferentially about each rod 77 between the flanges 92 of crown 87 and an equalizing spring adjustable collar 93. Further downward movement of the carriage assembly 14 results in the compression loading of the springs 79 of each coring assembly 61. As this compression force is built up, the rods 77 continue their downward movement until the springs 90 have reached their compression limits. Then, the sleeves 78 tend to move away from their adjacent collars 82 as downward movement of carriage assembly 14 continues; thus, further downward movement of the crown 87 is arrested.

Simultaneously, as the carriage 14 continues its descent, the coring assembly 61 including the shaft 62 continues its downward descent; thus, the coring assembly 61 including the locating bar 71 moves downwardly relative to the rods 77 and the crown 87. Thus, locating bar 72 slideably moves downwardly along the rods 77 away from the limit collars 83. The configuration of the coring assembly 61 at this time in machine operation is illustrated, for example, in FIG. 4.

As further movement downwardly of carriage 14 continues, the tip 94 of coring knives 54 reaches the vegetable member 89 (here a cabbage), and coring action thereon commences. As the carriage 14 continues its descent, the coring knife 54 moves into the vegetable piece 89, and coring thereof occurs as the shaft 62 rotates. All during this period, the coiled spring 84 operates to maintain contact between the upper portion of sleeve 63 and the bottom portion of the collar 74. This contact is continued until, with further downward movement, the locating bar 72 comes into engagement with adjustable stop collar 95, each such collar (paired) being associated with a different one of the rods 77.

When such contact between bar 72 and collars 95 is achieved, then downward movement of the shaft 62 is arrested because of the clamped interrelationship between the bar 72 and the shaft 62. At this time, further penetration of the coring knife 54 into each vegetable piece 89 ceases.

Thus, in operation of the apparatus 10, there is a fixed penetration distance for each coring knife into the vegetable member being cored which fixed distance is determined after the crown has been engaged with the vegetable piece 89 and this distance of coring penetration depth is independent of the size of the individual vegetable piece being cored at any given station. This is a particularly desirable object and feature of the present invention, since it has been found through experience that the core size in a given batch of vegetable pieces 89 being cored is substantially the same from one vegetable piece to another thereof regardless of individual size variations in the batch of vegetable pieces.

Obviously, the carriage 14 has itself no means for determining the size of the individual vegetable pieces 89 undergoing a coring operation so the carriage 14 is adjusted so as to travel downwardly to a maximum low level which is chosen in advance to be sufficient to achieve a desired coring depth on the smallest size of vegetable pieces which it is anticipated will be involved in a given coring operation. In the case of any individual vegetable piece 89 (such as a cabbage head indicated above), as the coring knife 54 thus moves to its maximum depth of penetration (but with the carriage assembly 14 still continuing to travel downwardly until it reaches its maximum descent position), each spring 84 experiences a longitudinal compression circumferentially about the associated shaft 62. The rotating shaft 62 thus remains in a longitudinally fixed position, but the sleeve 63, carried as it is on the carriage 14, slideably moves longitudinally downwardly along the shaft 62. Because of the keyway 65, there is a lost motion axially between the shaft 62 and the sleeve 63. Because the shaft 62 in this operational interval is fixed in its position of maximum descent while the sleeve 63 longitudinally moves relative to the shaft 62, a separation occurs between the sleeve 63 and the collar 74.

Another feature and object of the present invention is that different sizes vegetable pieces such as pieces 89a and 89b, for example, in FIG. 5, can be simultaneously cored by their respective associated coring assemblies such as 61a and 61b, because of the fact that, although each coring assembly 61a and 61b initially moves downwardly simultaneously with downward movement of the carriage 14, once each crown 87a and 87b has engaged its respective associated vegetable piece 89a and 89b, the movement downwardly of each coring assembly 61a and 61b occurs independently of the other because of the independent sliding movement capabilities of each individual coring assembly 61 relative to carriage 14, once an individual vegetable 89a or 89b has been engaged by the respective crowns 87a and 87b. The important relationship is that, once an individual crown 87 has engaged an individual vegetable piece 89, the stop collars 95 are set. Consequently, each rotating shaft 62 and its associated coring knives 54 accomplishes a constant penetration depth into an individual vegetable piece 89 which is presetable. Thus, as a coring assembly 61 descends the locating bar 72 makes contacts with the collars 95 (as shown in FIG. 5) at different levels with respect to the individual vegetable pieces 89a or 89b, as seen for example in FIG. 5, being cored. The larger the vegetable piece such as 89b the greater the separation between the collar 74 and the sleeve 63 at the end of downward travel of the carriage 14 during a given coring operation. The sleeve 63 and the collar 74 remain in an abutting engagement until the maximum depth of penetration of the coring knives 54 into an individual vegetable piece 89 has been achieved. In this way, each one of the vegetable pieces undergoing coring has the same size of core removed therefrom. The advantage of this is that waste, as from overcore cutting, is eliminatable yet at the same time substantially all of the unwanted core is removable.

After a desired coring operation on a vegetable piece 89 has been achieved, and the carriage 14 has reached its bottom limit of travel, then the cylinder 18 is actuated and the piston rod 24 thereof is retracted, thereby raising the carriage 14. As the carriage 14 is raised, the sleeve 63 slidably moves upwardly away from the knives 54 until re-engagement of sleeve 63 with collar 74 occurs. With continued upward movement of the carriage 14, at this point, the bar 72 is raised, and upward sliding movement of the bar 72 relative to the rods 77 occurs with the consequence that the coring knives 54 are lifted out of a given vegetable piece 89 with the crown 87 still remaining in contact therewith. Simultaneously, as the carriage 14 is upwardly moving, the mounting sleeves 78 slidably move upwardly along the rods 77 until the upper end of each sleeve 78 engages its adjacent stop collar 82 at which point, with continuing upward movement of the carriage 14, the crown 87a and 87b (referring to FIG. 5) is completely lifted away from the associated vegetable piece such as 89a and 89b. The carriage thereafter continues upwardly to its initial point of maximum upward travel or starting position so that a complete cycle of machine operation has been completed (the position of maximum carriage upward travel being illustrated by FIG. 2).

For convenience herein, such a plurality of coring assemblies 61 in apparatus 10 is termed the coring station and is designated in its entirety by the numeral 99. A row of vegetable holders 52 on a plate 53 is brought into alignment with the axes of a plurality of coring assemblies 61 at the coring station. When the conveyer assembly 47 advances, a row of vegetable holders 52 is then advanced optionally to another station in the apparatus 10, this second station being an apparatus 10 designated in its entirety for convenience by the numeral 100 and being termed herein the slicing station. At the slicing station 100, the respective individual cored vegetable pieces 89, each duly cored from the operation of the coring station 99, are subjected to a slicing operation. The slicing operation can be used to produce cut vegetable pieces of any desired size cutting can be accomplished through the driving of one or more blade members into an individual cored vegetable piece 89. For example, in apparatus 10, each slicing blade cluster 108 is comprised of four individual blades 102, each individual blade 102 being radially outwardly arranged from a common hub 103 at 90° intervals and each individual blade 102 being provided with a horizontally extending downwardly located cutting edge. The blades can be associated with the hub 103 by any convenient means, such as welding or the like. The hub 103 is carried at the bottom end of a slicing shaft 104 which is generally vertically disposed. Each shaft 104 is fixedly mounted relative to carriage 14 by cross plates 107 through which the shaft 104 extends. The position of shaft 104 relative to carriage assembly 14 may be adjusted by means of nut 109 which threadably engages the digital end of shaft 104. The structure of vegetable holder 52 involves the use of four support fingers 110 which are arranged so as to be alternately positioned equi-distantly between individual blade members 102 of the assembly of hub 103 and cutting blades 102. As the carriage 14 descends when cored vegetable pieces 89 are in position the blades 102 exert a guillotine-like cutting action which, in the apparatus 10, effectuates a quartering of each core the vegetable piece 89 into four components which, after severence, drop away into a collection pan 112 positioned beneath station 100. The depth of penetration of the knife cluster 108 is adjusted so that, when the carriage 14 has moved to its maximum downward position, each cutting cluster 108 is in adjacent spaced relationship to the base plate 113 of the holder 52. Thus, the apparatus 10 accomplishes in a single mechanism successive coring and slicing operations. As those skilled in the art will appreciate, in instances where one does not wish to effectuate any vegetable cutting operation following a coring operation the slicing station 100 can be eliminated from apparatus 10.

Another embodiment of apparatus of the present invention is illustrated in FIGS. 7-9, such embodiment being herein designated in its entirety as apparatus 17. Apparatus 17 is seen to employ two horizontally spaced work stations 118 and 119, respectively, relative to the direction of movement of work pieces positioned on a stop and go conveyer system 120. Each work station 118 and 119 employs its own frame 122 and 123, respectively. The frame 123 is provided with a drive and control arrangement similar to that employed in the embodiment of FIGS. 1-6, such arrangement being herein designated for convenience in its entirety by the numeral 124. For convenience, parts in drive and control arrangement 124 which is similar to those in the drive and control arrangement of the apparatus 10 are similarly numbered but with the addition of prime marks thereto. Thus, even though two spaced frames are employed in apparatus 117, only a single drive and control arrangement are employed.

Apparatus 117 advantageously employs two separate carriage assemblies 127 and 128, respectively, the assembly 127 being associated with frame 122 and the carriage assembly 128 being associated with the frame 123. Thus, the carriage assembly 127 if desired may have a stroke length which is substantially different from the stroke length associated with the operation of carriage 128. Another advantage for the separate work stations 118 and 119 is that each such station can employ separate separation systems. Thus, at station 118 undesirable waste products are collected and independently removed whereas from station 119 one obtains entirely a useful product which needs to be separately collected and removed from the vicinity thereof. In operation of apparatus 117, it is preferred to use the same actuating valve assembly to operate each of the carriage-reciprocating fluidic cylinder assemblies 129 and 130, respectively. For example, a single valve 60 (refering to the apparatus 10) can be interconnected directly with each of the cylinder assemblies 129 and 130 so as to cause each cylinder to operate substantially simultaneously with one another thus causing these cylinders assemblies 129 and 130, respectively, to operate in synchronism with the stop and go advancing action of the conveyer system 120 as desired.

In the embodiment shown, cauliflower arrives in the vicinity of the vegetable holder loading region 132 via a shute 133. One or more human operators, preferably one on either opposed side of region 132 (not shown) are used to arrange and orient the individual vegetable pieces, here cauliflower, upon individual fruit holders 52'. The apparatus 10 can employ 2, 4 or other desired numbers of individual coring assemblies 61' although the same number of coring assemblies is employed in each work station 118 and 119, of course.

The structure of the individual carriage assemblies 61' employed in each of the work stations 118 and 119 is substantially identical to the structure of the coring assembly 61 employed in apparatus 10.

At work station 118, the retained green leafy material and projecting stalk of a freshly picked cauliflower 135 are removed. The coring knife assembly 54' employed in station 118 is thus configured so as to provide a relatively large diameter relatively shallow cut into the stem region of an individual cauliflower 135. Similarily, the coring knives 54" employed in the station 119 are configured in each coring assembly 61 so as to have a desired depth of penetration into an individual cauliflower 137 which has been previously processed at station 118.

Thus, at station 118, the collars 82 and 95, respectively, are set and adjusted so as to achieve the shallow cutting effect desired for an individual run on a group of cauliflowers from a common field collection operation. In this operation, substantially all of the undesired waste material associated with the stem or bottom region of an individual cauliflower is removed.

In the next station 119, the collars 82 and 95, respectively, are adjusted so as to provide in a cutting operation a configuration as shown, generally, for example in FIG. 9, where the position of maximum coring knife penetration into a cauliflower 37 is depicted relative to the position of the crown 87".

As those skilled in the art will appreciate, the longitudinal spacing (relative to conveyer system 120) of the work station 118 from the work station 119 is some multiple of the distance between successive stop positions along the conveyer system 120. As those skilled in the art will also appreciate, additional stations or function, if desired, can be interposed between the vegetable loading station 132 and station 118, or between the station 118 and the station 119, if desired. For example, a vegetable washing (note detailed) station can be interposed between the station 118 and the station 119.

In apparatus 117, at station 119, individual cauliflower members (which have been here processed in upstream operation including the preliminary clean-up coring operation earlier described in reference to station 118) are processed not only so as to effectuate coring as shown, for example, in FIG. 9, but also so as to effectuate a break-up of the cored individual cauliflower 137 into flowerlets. Thus, the relationship between the pressure applied axially by the crown 87" upon a cauliflower 137 in combination with the operation of the coring knives 54" is such that as the coring knives 54" reach their position of deepest penetration into a cauliflower 137, the cauliflower breaks up and disintegrates. This break-up can occur progressively for an individual cauliflower at various times during the coring operation thereof with the knives 54. Thus, a break-up may start as soon as the coring knives 54" enter the cauliflower or it may be postponed until a position relatively late in a given coring operation has been achieved. As soon as each individual flowerlet has been severed from the main stalk being cored, it is free to drop away, as those skilled in the art will appreciate. Thus, the configuration for a cauliflower 137 as shown in FIG. 9 represents an operating configuration which is believed to seldom occur in practice since, in this configuration the coring knives have in fact reached a maximum position of penetration relative to the crown 87″, but this view as shown in FIG. 9 is provided so as to illustrate penetration depth for the coring knives 54″ relative the crown 87′ in contrast to the situation which exists with the coring knives 54′ in relation to that associated crown 87′. In apparatus 117 after individual flowerlets are separated, they tend to drop away and can fall against surface portions of a collection pan 112′. As the conveyer system 120 advances, individual flowerlets are skidded along on the collection pan, move over the forward end of the apparatus 117, and are finally allowed to fall downwards onto a conveyer belt or the like for further processing (and possibly packaging).

I claim:

1. Apparatus for coring vegetables and the like comprising in combination:
   (A) a translatable carriage means,
   (B) a vegetable hold down means including supporting rod means extending from said carriage means, said rod means including first stop forming means permitting said hold down means to assume a first stop position while said carriage means is translating,
   (C) a rotatable blade assembly extensible through said hold down means and including co-rotatable sleeve means and blade supporting shaft means carried by said carriage means for translation movement therewith, said blade assembly including second stop forming means permitting said shaft means to assume a second stop position while said carriage means is translating, and
   (D) guide means interconnecting said blade assembly at a definite location and slidably interconnecting said rod means and including stop means associated with said rod means limiting the extent of such translational movements of said blade assembly by reference to the position of said hold down means.

2. Apparatus for coring vegetables and the like comprising in combination:
   (A) a conveyor means adapted to sequentially position a vegetable in a coring station,
   (B) a carriage means positioned at said coring station for translational movement towards and away from said conveyor means,
   (C) a vegetable hold down means supported by rod means from said carriage means, said rod means including first stop forming means permitting said hold down means to assume a stopped vegetable hold down position while said carriage means is translating downward toward said conveyor means,
   (D) a rotatable blade assembly extensible through said hold down means and including co-rotatable sleeve means and blade supporting shaft means carried by said carriage means for translational movement therewith, said shaft means including second stop forming means permitting said shaft means to assume an axially stopped coring position while said carriage means is translating downward toward said conveyor means,
   (E) guide means interconnected to said shaft means of said blade assembly at an axially fixed longitudinal location therealong and slidably interconnecting with said rod means and including stop means associated with said rod means limiting the translational movement of said shaft means toward said conveyor means by reference to the position of said hold down means.

3. Apparatus for coring vegetables and the like comprising in combination:
   (A) a generally upright carriage means,
   (B) vegetable hold down means adopted to be spaced above and in cooperating alignment with an underlying vegetable supporting means and having an aperture centrally defined therein,
   (C) suspending means for said hold down means including
      a pair of transversely spaced, vertically oriented rod means suspending said hold down means in non-rotating orientation relative to said carriage means,
      stop forming means connecting said pair of rod means to said carriage means and permitting said hold down means to remain in a stop position, when said carriage means is vertically moved in a predeterminable extent,
   (D) a blade assembly including:
      an elongated verticaly oriented shaft means disposed between said pair of rod means and projecting through said aperture,
      sleeve means positioned circumferentially about a mid portion of said shaft means and being longitudinally slidable relative thereto and having key means making said shaft means co-rotatable with said sleeve means,
      bearing block means rotatably mounting said sleeve means to said carriage,
      drive means for rotating said sleeve means including a power head, power transfer means, and support means therefor in relation to said carriage means,
      blade means functionally associated with a lower end if said shaft means in adjacent spaced relationship to said hold down means,
   (E) guide bar means transversely extending across said shaft means at a fixed location therealong and including thrust bearing means allowing rotation of said shaft means relative to said guide for means, said guide bar means also transversely extending across each of said rod means and being adopted for longitudinal sliding movements therealong,
   (F) and adjustable stop means associatd with each one of said rod means and located so as to permit prechosen limits of said longitudinal movement of said shaft means relative to said carriage means, whereby, when said hold down means is in such a stop position, the longitudinal distance which said blade means travels is predeterminable relative to said hold down means.

4. Apparatus for coring vegetables and the like comprising in combination:
   (A) a stationary frame assembly,
   (B) a carriage assembly including a carriage frame and mounting means therefor reciprocally mounted to said frame assembly and adapted to make reciprocal generally vertical movements relative thereto,
   (C) vegetable support means associated with said frame assembly located adjacent said carriage assembly and adapted to support a vegetable member in a core removal position, (D) a vegetable hold down means supported by vertically extending rod means from said carriage means in cooperating vertical alignment with said support means said rod means including first stop forming means permitting said hold down means to assume a stop position while said carriage means is translating, (E) a blade assembly extending through said hold down means and having a corotatable sleeve means supporting said blade assembly from said carriage means, said sleeve means including second stop forming means permitting independent translation movement of said blade assembly relative to said carriage means, (F) guide means which rotatably interconnects with said blade assembly at a definite location therealong and which also slidably interconnects with said rod means and including stop means associated with said rod means limiting the extent of such translational movements of said blade assembly by reference to the position of said hold down means.

* * * * *